(12) United States Patent
Martin et al.

(10) Patent No.: US 11,076,575 B2
(45) Date of Patent: Aug. 3, 2021

(54) APPARATUS AND METHOD FOR PET WASTE CONTAINMENT AND DISPOSAL

(71) Applicant: Microfine, Inc., Winston-Salem, NC (US)

(72) Inventors: John Martin, Winston-Salem, NC (US); Peter Palmer, Los Gatos, CA (US)

(*) Notice: Subject to any disclaimer, the term of this patent is extended or adjusted under 35 U.S.C. 154(b) by 464 days.

(21) Appl. No.: 14/513,652

(22) Filed: Oct. 14, 2014

(65) Prior Publication Data
US 2015/0059653 A1    Mar. 5, 2015

Related U.S. Application Data

(63) Continuation-in-part of application No. 14/104,262, filed on Dec. 12, 2013, now Pat. No. 9,363,976.

(60) Provisional application No. 61/736,120, filed on Dec. 12, 2012.

(51) Int. Cl.
*A01K 1/01* (2006.01)

(52) U.S. Cl.
CPC .................. *A01K 1/0107* (2013.01)

(58) Field of Classification Search
CPC ..... A01K 1/0107; A01K 1/011; A01K 1/0114
USPC ........ 119/165, 166, 167, 168, 169, 170, 171
See application file for complete search history.

(56) References Cited

U.S. PATENT DOCUMENTS

| | | | | |
|---|---|---|---|---|
| 2,166,837 A | * | 7/1939 | Ash | A47B 13/086 24/618 |
| 2,670,518 A | * | 3/1954 | Quidor | A01G 5/00 27/19 |
| 3,242,509 A | * | 3/1966 | Nissen | A63B 6/00 273/DIG. 4 |
| 3,576,039 A | * | 4/1971 | Roberts | A61F 5/485 5/484 |
| 3,626,899 A | * | 12/1971 | Spellman | A01K 1/0107 119/169 |
| 3,694,983 A | * | 10/1972 | Couquet | B29C 70/78 404/40 |
| 3,734,309 A | * | 5/1973 | Bateman | A47G 23/06 206/504 |
| 3,735,988 A | * | 5/1973 | Palmer | A63B 67/02 428/17 |
| 3,811,566 A | * | 5/1974 | Bateman | B65D 21/02 206/504 |
| 3,908,828 A | * | 9/1975 | Lohwasser | B65D 21/0202 206/504 |
| 3,971,194 A | * | 7/1976 | Morgan | B68C 1/12 54/66 |
| 4,055,022 A | * | 10/1977 | Rowe | A01G 27/00 47/79 |
| 4,147,129 A | * | 4/1979 | Ruplen | A01K 1/0353 119/169 |
| 4,326,481 A | * | 4/1982 | Gruss | A01K 1/0107 119/171 |

(Continued)

FOREIGN PATENT DOCUMENTS

WO    WO 9526629 A1 * 10/1995 ........... A01K 1/0107

*Primary Examiner* — Ebony E Evans

(74) *Attorney, Agent, or Firm* — FisherBroyles, LLP

(57) ABSTRACT

Herein described is a portable sanitation apparatus for pet waste disposal and method for using the same comprising a micro-composite structure and a means for securing micro-composite structures together to form a macro-composite structure in variable geometric Configurations and sizes for greater area coverage.

14 Claims, 18 Drawing Sheets

(56) References Cited

U.S. PATENT DOCUMENTS

| | | | | |
|---|---|---|---|---|
| 4,484,661 A * | 11/1984 | Evenson | F16N 31/006 184/106 |
| 4,627,381 A * | 12/1986 | Reed | A01K 1/0107 119/165 |
| 4,631,765 A * | 12/1986 | Casey | A47G 9/0207 428/33 |
| 4,878,258 A * | 11/1989 | Casey | A47G 9/0207 160/368.1 |
| 5,027,442 A * | 7/1991 | Taylor | A63H 5/00 2/300 |
| 5,066,000 A * | 11/1991 | Dolan | A63B 23/0464 472/90 |
| 5,099,532 A * | 3/1992 | Thomas | A61F 5/485 5/484 |
| 5,144,911 A * | 9/1992 | Moore | A01K 1/0353 119/28.5 |
| 5,270,089 A * | 12/1993 | Alston | F16N 31/006 15/215 |
| 5,297,304 A * | 3/1994 | O'Sullivan | A47C 7/425 297/284.5 |
| 5,311,837 A * | 5/1994 | Mamer-Boellstorff | A01K 1/0353 119/28.5 |
| 5,791,289 A * | 8/1998 | Savicki | A01K 1/0107 119/165 |
| 6,079,363 A * | 6/2000 | MacLaine | A01K 1/0107 119/161 |
| 6,102,086 A * | 8/2000 | Holtby | F16N 31/006 141/311 A |
| 6,451,405 B1 * | 9/2002 | Diemer | F16N 31/006 184/106 |
| 6,718,714 B1 * | 4/2004 | Montgomery, Sr. | F24D 13/022 404/15 |
| 6,802,281 B2 * | 10/2004 | Otsuji | A01K 1/0157 119/168 |
| 6,837,179 B2 * | 1/2005 | Sannikka | A01K 23/005 119/165 |
| 6,988,848 B2 * | 1/2006 | Arsenault | F16N 31/006 180/69.1 |
| 7,249,570 B1 * | 7/2007 | Roberson | A01K 1/0107 119/169 |
| 7,290,558 B2 * | 11/2007 | DeChard | A47K 3/286 137/312 |
| 7,392,765 B2 * | 7/2008 | Lingmann | A01K 1/0107 119/172 |
| 7,836,533 B2 * | 11/2010 | Rosenberg | A47D 15/003 5/484 |
| 8,015,637 B2 * | 9/2011 | Papen | A47D 15/003 5/482 |
| 8,033,249 B1 * | 10/2011 | Cook | A01K 1/0107 119/165 |
| 8,042,489 B2 * | 10/2011 | Takahashi | A01K 1/0107 119/169 |
| 8,122,682 B2 * | 2/2012 | Mischo | E04D 7/005 52/747.1 |
| 8,518,516 B1 * | 8/2013 | Konasiewicz | B32B 3/06 428/100 |
| 8,656,863 B2 * | 2/2014 | Havluciyan | A01K 1/0107 119/165 |
| D702,895 S * | 4/2014 | Mishan | D30/161 |
| 9,363,976 B2 * | 6/2016 | Martin | A01K 1/0107 |
| 9,776,033 B2 * | 10/2017 | Fasullo | A63B 21/4037 |
| 2005/0284392 A1 * | 12/2005 | Hillman | A01K 1/011 119/169 |
| 2006/0260559 A1 * | 11/2006 | Fry | A01K 1/0152 119/526 |
| 2009/0241978 A1 * | 10/2009 | Moretti | A47K 7/026 132/200 |
| 2010/0047487 A1 * | 2/2010 | Pfeiffer | D02G 3/406 428/17 |
| 2012/0118241 A1 * | 5/2012 | Smith, II | A01K 1/0107 119/167 |
| 2013/0298840 A1 * | 11/2013 | Mishan | A01K 1/0107 119/165 |
| 2014/0068858 A1 * | 3/2014 | Wambeke | A47G 9/062 5/420 |

* cited by examiner

APPARATUS AND METHOD FOR PET WASTE CONTAINMENT AND DISPOSAL

CROSS REFERENCE TO RELATED APPLICATIONS

This application is a continuation-in-part of application Ser. No 14/104,262, now pending, which claims priority to U.S. Provisional Patent Application Ser. No. 61/736,120 filed Dec. 12, 2012. The disclosures of application Ser. Nos. 14/104,262 and 61/736,120 are incorporated by reference herein in their entirety.

FIELD

The general field is pet waste containment and disposal systems, in particular, a portable sanitation apparatus for pet waste disposal comprising an overall composite structure ("micro-composite") with two primary layers and an engagement means for attaching, the two primary layers together, and a means for integrating or combining two or more micro-composite structures together to form a macro-composite for greater area coverage.

BACKGROUND

Urban pet owners, particularly those who live in small flats, condominiums and/or apartments have very few Waste disposal options when it comes to pets. While the owners are away for any significant amount of time, the dog or cat will undoubtedly need to urinate and/or defecate and, unless the person is willing to hire a dog walker, pet owners must endure some unpleasant conditions when they return to the dwelling. Moreover, allowing a pet to urinate unconditionally within an inhabited area is clearly contrary to good health practices. Thus, it is highly desirable to confine the urination to a small area where the urine can be collected and disposed of hygienically.

Feline pets, such as house cats, are capable of litter box training—a very convenient, sanitary, and effective means to contain and dispose of feline waste. Litter boxes or litter trays are filled with a granular substance (generally known as cat litter) which absorbs urine and covers feces reducing or camouflaging the odor. While cats are fairly easy to train to use litter boxes, other pets (notably dogs) are difficult or impossible to train in such a manner. Thus, an alternative solution is necessary.

Canine pets are very territorial and they tend to mark their territory with urine. It is quite common for outside dogs to urinate in the same place or places repeatedly due to the scent left by a dog's urine. Moreover, it has been found that dogs may he trained to urinate in a particular area of a dwelling if the artificial environment resembles a natural environment, such as grass. Artificial turf has been used successfully in this manner. Additional incentive may be achieved by impregnating the artificial turf with substances tint signal marking.

Artificial turf alone is porous and offers little resistance to the passing of urine; therefore some means of containing the urine is necessary. Placing, the turf in a tray filled with "cat litter" is not a practical solution to containment since the relatively high sides of the tray detract from the aim of providing an area which looks natural to the pet. To overcome this problem, the cat litter is often replaced with a relatively thin sheet of absorbent material which, when saturated, can be either disposed of and replaced or washed and re-used. Thus, there are products currently on the market that employ a rigid bottom or tray, followed by a layer of absorbent material, and followed by a layer of artificial turf on top. The tray serves two purposes: it contains any urine that might seep through or drip down the sides of the absorbent material and it secures the absorbent material in position directly underneath the porous artificial turf so that maximum urine capture is achieved.

A problem with these products is that they are difficult and cumbersome to transport from one location to the next and difficult to clean. While the top two layers may be rolled up and conveniently stored away, the bottom rigid layer or tray cannot. But without the tray to maintain proper positioning of the absorbent layer underneath the porous artificial turf layer, the product would be useless and the pet owner would be forced to discard urine from and clean the tray too often.

Another problem is limited area coverage. Some animals require more surface area than others and particularly in cases where there are multiple animals using the space, more area is required than the conventional single mat/tray designs.

One advantage to the present system is that it enhances the toilet design by achieving and maintaining proper positioning of the absorbent layer with the top porous artificial layer with or without the bottom rigid tray. Another advantage to the present system is that the user can conveniently clean the composite with conventional washing machines, whereas prior devices were unable to be cleaned in this fashion. And yet another advantage is that the user may conveniently and efficiently modify the surface area coverage to suit their specific needs by combining, two or more composite structures together with or without tray underlay. In so doing, the user may assemble two or more composite structures to cover, for example, a hall way, corners where two walls meet (e.g., right angles), or a whole room. Finally, the modularity of the design offers merchandizing convenience and versatility. For example, the supplier may sell and retailer may shelve a single package containing, for example, a starter kit covering a defined floor area. As the consumer decides to cover more floor area, the consumer may purchase additional components of identical size to the original single unit system. Therefore, there may be no need to manufacture and display various sizes (e.g., small, medium, or large) saving shelf space for the retailer.

BRIEF DESCRIPTION OF THE DRAWINGS

Representative embodiments of the invention are disclosed in more detail with reference to the following figures. Like reference numerals designate corresponding parts or steps throughout the different views.

SUMMARY

Figure 1A:
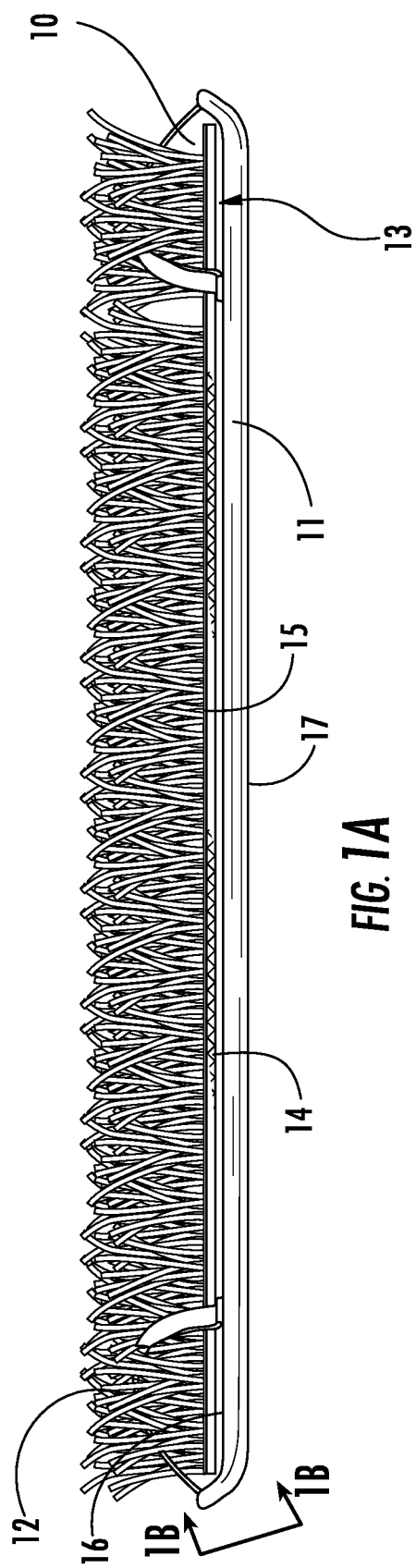
FIG. 1A shows side view of an embodiment of the present invention and FIG. 1B shows an illustration of a cradle stitching embodiment at the corner of the second layer.

A portable sanitation apparatus for pet waste disposal is provided generally comprising, a micro-composite structure with a plurality of layers. In one embodiment, the structure comprises at least two primary layers. In some embodiments, at least one of the primary layers comprises an engagement means wherein the two primary layers are held together in a relatively stable position with respect to another, but wherein the two primary lavers may easily and conveniently be disengaged and disassembled.

In one embodiment, the portable sanitation apparatus cornprises two primary layers, a first layer and a second layer. The first layer of the composite structure may have a composition resembling that of a natural outside environment, such as grass for example and may, itself, comprise multiple layers. In some embodiments, the first layer may comprise artificial grass-like fibers made from compounds selected from the group consisting of polypropylene, polyethylene, polymethylpentene, polybutene-1, polyisobutylene, ethylene propylene rubber, and ethylene propylene diene Monomer rubber. The first layer may also comprise a backing material further comprising a mesh substrate, a meshed backing material, and a binder material.

The second layer of the composite structure also may comprise multiple layers. In some embodiments, the second layer comprises at least an absorbant top element designed to trap and hold urine or other fluid therein and an impervious backing element for preventing moisture from escaping the absorbant top element.

In one embodiment, the absorbant top element comprises a blend of thermoplastic and cellulosic fibers mechanically entangled and heat bonded together. In one embodiment, the impervious backing element may comprise a woven polyester knit fabric reinforced with polyvinyl chloride.

In one embodiment, the binder material in the first layer may be deposited to the surface of the mesh substrate and made of a compound selected from the group consisting of latex, acrylic styrenated acrylics, vinyl acetate, ethylene vinyl acetate, styrene butadiene, polyvinyl chloride, ethyl/ vinyl chloride. In another embodiment, the binder material may be made of styrene butadiene latex.

In some embodiments, the absorbant to element may comprise 40% by weight of rayon, 17% by weight of polyester, 21% by weight of polyethylene and a to melt polyester blend, and 22% by weight of polypropylene. In another embodiment, the top absorbant element may comprise at least about 40% by weight of rayon. In an alternative embodiment, the top absorbant element comprises at least about 40% by weight of cotton. And in yet another embodiment, the top absorbant element comprises at least about 40% by weight of a cotton and rayon blend.

In some embodiments, the top absorbant element may comprise an antimicrobial agent. In one embodiment, the top absorbant element comprises 2,4,4'-trichloro-2'-hydroxy-diphenyl ether as the antimicrobial agent.

The composite structures of the present invention may be combined with other composite structures to form a macro-composite for increased surface area coverage. In some embodiments, second layers may be engaged to and secured to one another to ensure stable maximum and versatile area coverage with minimal to no fluid leakage or seepage between connected composite structures. In other embodiments, specially designed trays may be engaged to and secured to one another to ensure stable maximum coverage with minimal to no fluid seepage due to the engagement between trays. The shapes and sizes of a macro-composite structure may be quite varied. For example, in some embodiments, the area covered by a macro-composite is a rectangle or a square for wider area coverage. In some embodiments, the area covered may be as wide as a single row of micro-composite structures, for example, for hall way coverage. In other embodiments, the macro-composite may form 90° angles and round a corner of two intersecting walls.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. The following detailed description is, therefore, not to be taken in a limiting sense.

Throughout the specification and claims, the following terms take the meanings explicitly associated herein, unless the context clearly dictates otherwise. The phrase "in one embodiment" or "in some embodiments" or "in a preferred embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on,"

By way of illustration, FIG. 1A shows a side view of an embodiment of the invention. The overall composite structure comprises a plurality of layers designed to prevent pet liquid waste from leaving the composite structure and leaking onto the surface upon winch the composite structure rests. In one embodiment, the composite structure comprises a first layer 10 fabricated as to mimic a naturally occurring surface (such as artificial turf) familiar to the pet. The structure also may comprise a second layer 11 comprised of an absorbent material. It should be recognized that some users of the pet waste disposal system of the present invention may desire to forego one or more of the layers. For example, users may determine that their pet does not require the first layer 10 which is designed to mimic a naturally occurring surface and does little to absorb and confine the pet waste. In this vein, the user may simply use the second layer 11 or the second layer combined with another layer.

As mentioned above, in some embodiments, first layer 10 may simulate the look and feel of natural turf Preparations of natural or artificial turf are known in the art and described in U.S. Pat. Nos. 1,939,846; 3,332,828; 3,944,452; 3,995,079; 4,007,307; 4,012,545; 4,230,752; and 4,268,551. Similarly, a variety of artificial turf mat constructions have been designed for golf practice surfaces. For example, U.S. Pat. No. 6,156,396 uses a relatively thick base pad of resilient material (foam rubber) and an artificial grass-like carpet. U.S. Pat. No. 5,830,080 by Reynolds discloses a turf simulating surface including a grass-like carpet layer placed over various layers of material, each layer designed to simulate the shock absorbing nature of corresponding layers of soil. Each of the preceding U.S. patents is incorporated by reference in its entirety and in a manner consistent with the present document. It should be understood that the present invention is likewise applicable to structures, composites, or products.

As depicted in the embodiments shown in FIGS. 1A, 2, 3, and 6, first layer 10 is an artificial grass-like structure comprising grass-like fibers 12 from the olefin family of polymers. For example, the fibers may be composed of polypropylene, polyethylene, polymethylpentene, polybutene-1, polyisobutylene, ethylene propylene rubber, ethylene propylene diene Monomer rubber, at the like. In a preferred embodiment, grass-like fibers 12 are made of polyethylene.

Figure 3:
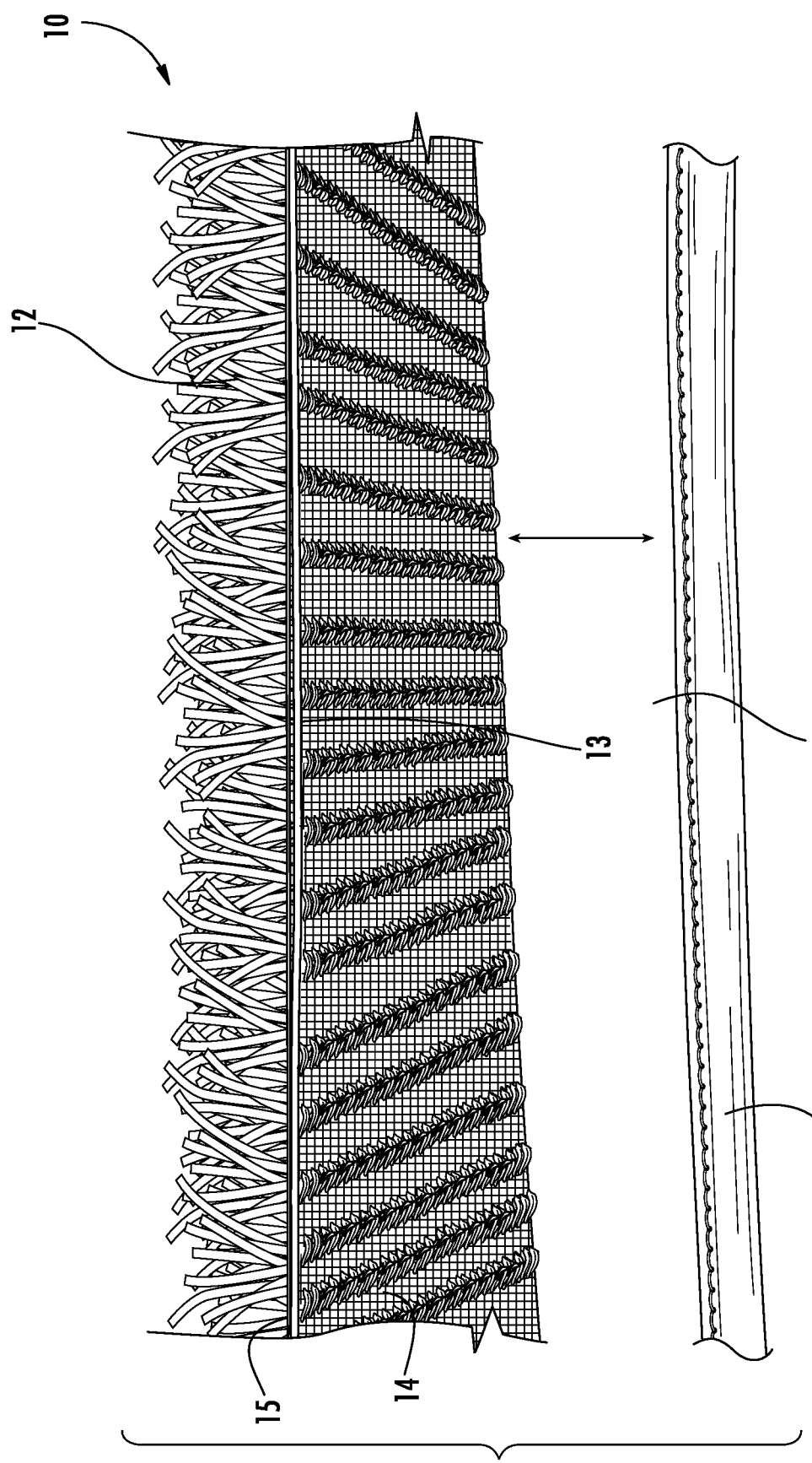
FIG. 3 shows a side view of an embodiment of the present invention with first layer lifted and exposing. second layer.

Referring primarily to the embodiment shown in FIG. 3, first layer 10 includes a fiber substrate component 13 which comprises a mesh substrate 14 made of a material flexible enough to allow some folding or rolling of the first layer 10, but rigid enough to maintain the general shape and form. In one embodiment, mesh substrate 14 is made of a polyolefin based polymer, for example polypropylene, polyethylene, polymethylpentene, polybutene-1, polyisobutylene, ethylene propylene rubber, ethylene propylene diene monomer tubber, at the like. In a preferred embodiment, mesh substrate 14 is made of polypropylene.

Figure 6:
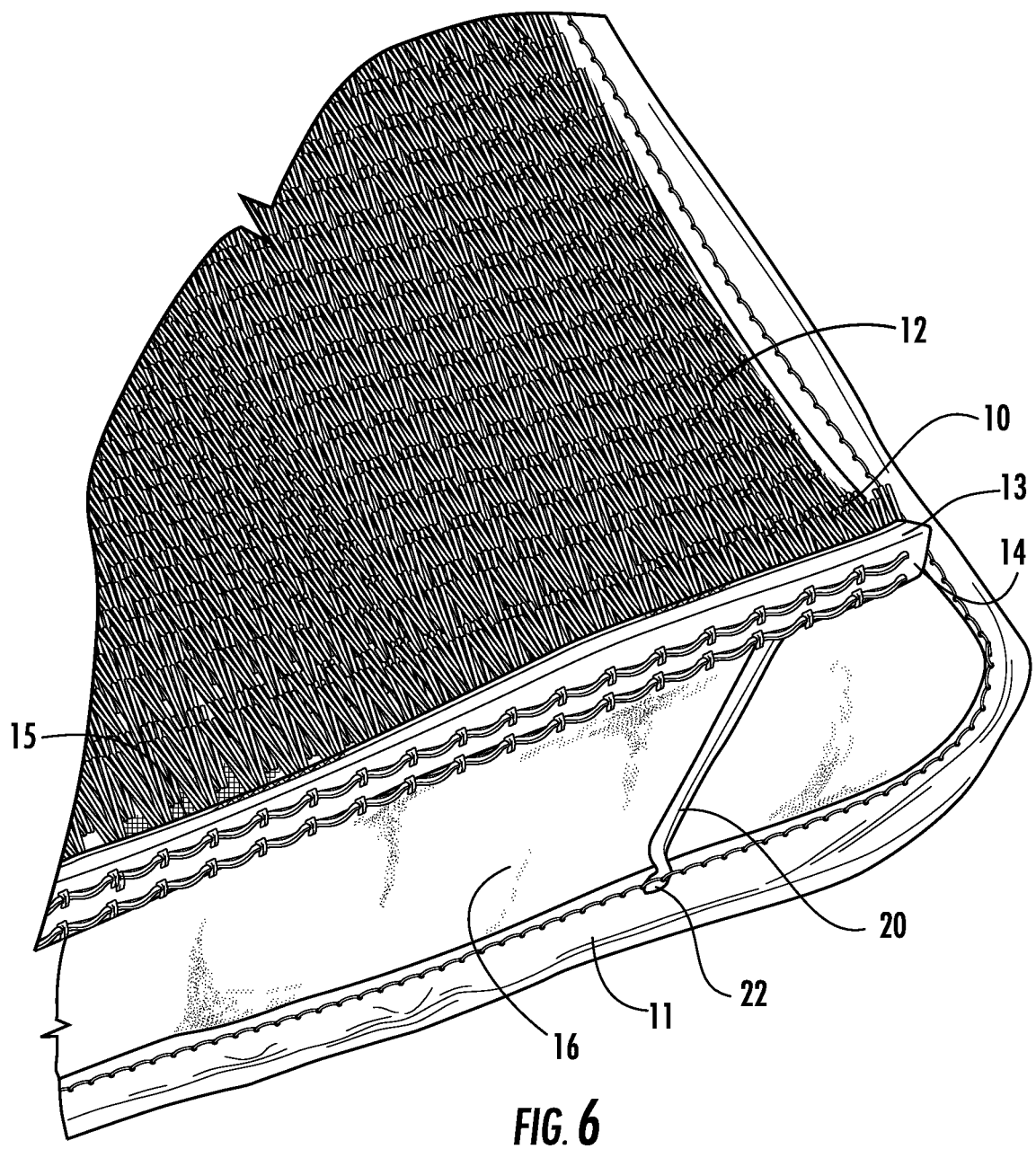
FIG. 6 shows an elevation view of an embodiment of the present invention.

Referring now the embodiment illustrated in FIG. 6, backing 13 on first layer 10 further comprises a thin meshed backing material 15 that is affixed to the mesh substrate 14 in between the grass-like fibers 12 and the mesh substrate 14. Meshed backing material 15 may be affixed to mesh substrate 14 by any means known to those of skill in the art, including gluing and the like. In some embodiments, grass-like fibers 12 are woven or punched through meshed backing material 15 into and through mesh substrate 14.

Fiber substrate component 13 on first layer 10 may additionally comprise a binder material for affixing or binding the grass-like fibers 12 to the mesh substrate 14 and meshed backing material 15. In a preferred embodiment, said binder material is deposited to the surface of the mesh substrate 14 at or near where the grass-like fibers 12 emerge there through. Suitable binding materials include latex, acrylic, styrenated acrylics, vinyl acetate (VAC), ethylene vinyl acetate (EVA), styrene-butadiene, polyvinyl chloride (PVC), ethylene/vinyl chloride and the like. In a preferred embodiment, the binder material is styrene butadiene latex.

Figure 4:
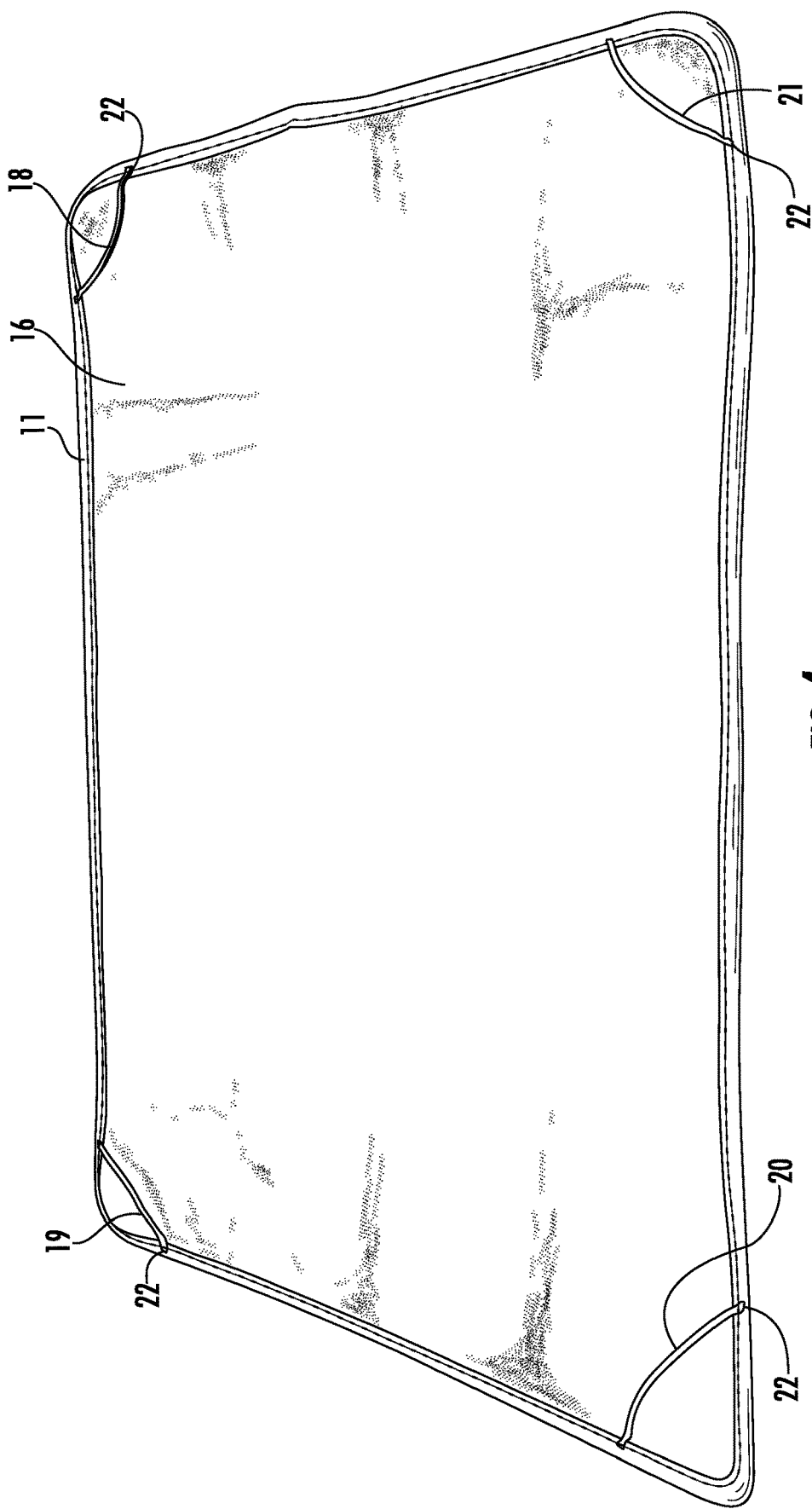
FIG. 4 shows an elevation view of an embodiment of the second layer of the present invention.

Absorbent second layer 11 (generally illustrated in FIG. 4), itself, may comprise multiple layers. Examples of such absorbent composite multi-layered structures are known in the art and have been described in, for example, U.S. Pat. No. 4,798,603 issued Jan. 17, 1989 to Meyer et al. and entitled Absorbent Article Having a Hydrophobic Transport Layer. Other examples include, U.S. Pat. No. 4,338,371 issued Jul. 6, 1982 to F. Dawn, et al. and U.S. Pat. No. 4,259,958 issued Apr. 7, 1981 to R. Goodbar. Other configurations have employed embossed layers configured to provide raised regions that separate the user from the absorbent pad. For example, see U.S. Pat. No. 4,324,247 issued Apr. 13, 1986 to M. Aziz; U.S. Pat. No. 4,041,951 issued Aug. 16, 1977 to L. Sanford; U.S. Pat. No. 3,945,386 issued Mar. 23, 1976 to E. Anczurowski, et al.; and U.S. Pat. No. 4,413,032 issued Nov. 1, 1983 to L. Hartmann, et al., U.S. Pat. No. 4,480,000 issued Oct. 30. 1984 to I. Watanabe, et al. describes an absorbent article which includes an absorbent core layer and a barrier covering the lateral faces and the underneath face of the absorbent core layer. A web predominantly comprised of a polyester fiber is placed on top of the absorbent core layer, and a nonwoven fabric, is wrapped around the structure. The absorbent articles are described as being able to absorb fluid at an enhanced rate and have a feeling of dryness even after such absorption. U.S. Pat. No. 3,987,792 issued Oct. 26, 1976 to J. Hernandez, et al. describes a disposable diaper comprising, in order, a water-pervious layer; a spongy, resilient and compressible hydrophobic fibrous layer; an absorbent core; and a water-impervious layer. The hydrophobic fibrous layer is pervious to fluids in the uncompressed condition, but is impervious to fluids when compressed. The description indicates that the compressed fibers intermesh to form a seal or barrier. Each of the preceding U.S. patents is incorporated by reference in its entirety and in a manner consistent with the present document.

Figure 5:
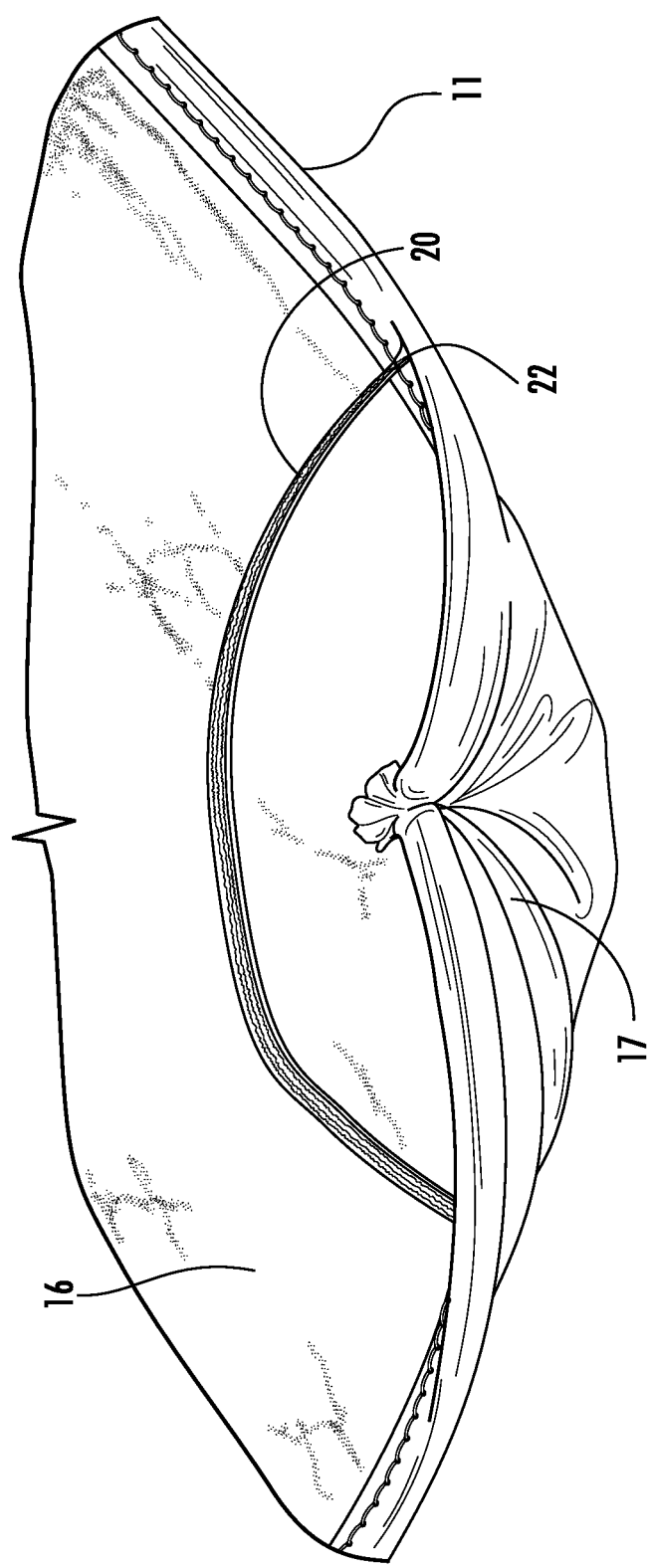
FIG. 5 shows an embodiment of the second layer with a cradle stitch design.
Figure 7:
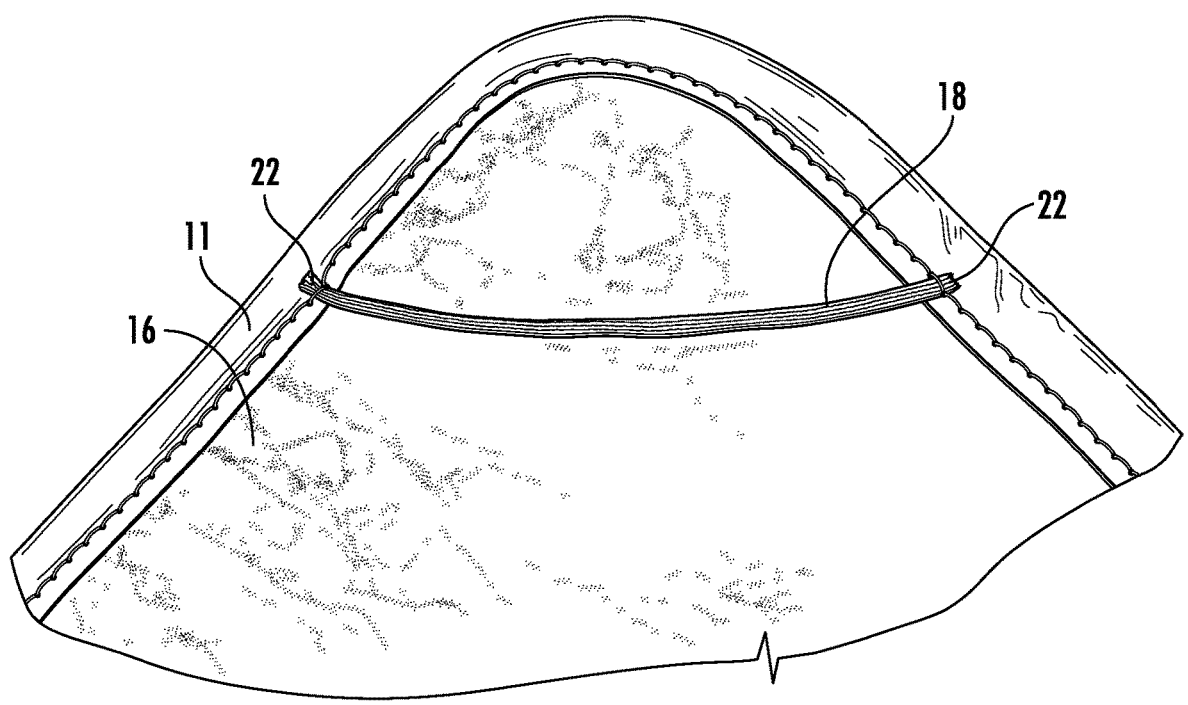
FIG. 7 shows an elevation view of an embodiment of the second layer.

Referring now to FIGS. 6 and 7, absorbent second layer 11 comprises at least two layers, a top layer 16 and a bottom layer 17 (shown in FIGS. 1 and 5). Bottom layer 17 may be described as an impervious "fabric-like" synthetic composition designed to prevent moisture from escaping from the composite after it passes into the absorbent top layer 16. In one embodiment, bottom layer 17 comprises a woven polyester knit fabric reinforced with polyvinyl chloride (PVC). In a preferred embodiment, the reinforced polyvinyl chloride is on the side of the absorbent second layer 11 that is visible to the user of the apparatus to help confine liquid pet waste to the other layers.

Top layer 16 may consist of a synthetic and/or cellulosic blend of fibers that provides a durable structure. In one embodiment, top layer 16 is a blend of thermoplastic and cellulosic fibers that are mechanically entangled and heat bonded. Fibers suitable for the purposes of the invention include cellulosic and/or synthetic thermoplastic fibers, including but not limited to polyolefin polymers. For example, a suitable blend of natural and synthetic fibers for the purposes of the present invention consists of polyester (low melt), polyethylene, rayon, cotton, and/or polypropylene. In one embodiment, the rayon may be used in place of the cotton and vice versa.

Proportions of the blend of fibers comprising the top layer 16 for the purposes of the present invention are variable. Desirable performance has been noted when each individual fiber constituent is within about 10 to 75% by weight. For example, in one embodiment the proportions are as follows: rayon 40%, polyester 17%, polyethylene+low melt polyester 21%, and polypropylene 22% by weight. It has been observed that optimal absorbency is achieved when the blend is comprised of at least about 40% by weight of rayon and/or cotton.

Fiber constituents of the top layer 16 may contain certain agents embedded into the fibrous structure that improve the performance of the invention. For example, high density polyethylene fibers may be used which embed biocides, antimicrobials, anti-viral, and/or antifimgal agents. Examples of commercially available antimicrobial agents that are suitable for the present disclosure include BARDAC®. 2050 and BARDAC® 2080 (based an dialkyl ($C_8$-$C_{10}$)dimethyl ammonium chloride); BARDAC®. 2250 and BARDAC®, 2280 (dickeyl dimethyl ammonium chloride); BARDAC®. LF and BARDAC®. LF 80 (based on dioctyl dimethyl ammonium chloride); BARQUAT® MB-50 and BARQUAT® MB-80 (based on alkyl dimethyl benzyl ammonium chloride); BARQUAT® MX-50 and BARQUAT® MX-80 (based on alkyl dimethyl benzyl ammonium chloride); BARQUAT® OJ-50 and BARQUAT® OJ-80 (based on alkyl dimethyl benzyl ammonium chloride); BARQUAT® 4250, BARQUAT® 4280, BARQUAT® 4250Z, and BARQUAT® 4280Z (based on alkyl dimethyl benzyl ammonium chloride and/or alkyl dimethyl ethyl berizyl ammonium chloride); and BARQUAT® MS-100 (based on myristyl dimethyl benzyl ammonium chloride), which are available from Lonza, Inc., Fairlawn, N.J.

Other anti-microbial agents that may be used in the present disclosure include halogenated diphenyl ethers like 2,4,4'-trichloro-2'-hydroxy-diphenyl ether (Triclosant or TCS) or 2,2'-dihydroxy-5,5'-dibromo-diphenyl ether; phenolic compounds like phenoxyethanol, phenoxy propanol, phenoxyisopropanol, para-chloro-meta-xylenol (P(MX), etc.; bisphenolic compounds like 2,2'-methylene bis(4-chlorophenol), 2,2'-methyl bis(3,4,6-trichlorophenol), 2,2'-methylene bis(4-chloro-6-bromophenol), bis(2-hydroxy-3,5-dichlorophenyl)sulphide, and bi s(2-hydroxy-5-chlorobenzypsulphide; halogenated carbanilides (e.g., 3,4, 4-trichlorocarbanilides Triclocarbane or TCC); benzyl alcohols; chlorhexidine; chlorhexidine gluconate; and ehlorhesidine hydrochloride. Other suitable antimicrobial compounds may include those supplied by Thomson Research Associates, Inc., such as Ultra-Fresh DM-50 or Silpure.

In some embodiments, absorbent second layer 11 may comprise additional layers at any position within the sandwich structure. For example, the absorbent second layer 11 may include a top cover component that is made of a material with substantial wicking properties that wicks the moisture through quickly and into the top layer 16. In some embodiments, the top cover component may be a porous synthetic woven material, for example, manufactured of polyester fibers or a polyester blend of fibers. Users who desire a higher friction coefficient of the absorbent second layer promoting a more stable engagement between first and second layer with minimal relative movement between the layers, may forego the top cover component and prefer an uncovered top layer 16. Top layer 16 may incorporate other constituents into its composition or may be treated in such a manner to promote greater friction between first layer 10 and the absorbent second layer 11 for enhanced stability between layers.

In some embodiments, the composite structure (e.g. the absorbent layer 11) may include other beneficial adjuvants, such as for example, odor neutralizing agents useful for suppressing, treating, or preventing offensive and/or undesirable odors. For example, absorbent layer 11 may comprise aldehydes, flavonoids, metallic salts, water-soluble polymers, zeolites, activated carbon and mixtures thereof that are useful in such a manner. Other odor suppressing adjuvants are well known in the art and may be used for this purpose.

Perfumes and perfumery ingredients may also be used which comprise a wide variety of natural and synthetic chemical ingredients, including but not limited to, aldehydes, ketones, esters, and the like. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes may comprise extremely complex mixtures of such ingredients. Pro-perfumes are also useful in the present invention. Such materials are those precursors or mixtures thereof capable of chemically reacting e.g. by hydrolysis to release the perfume.

Figure 1B:
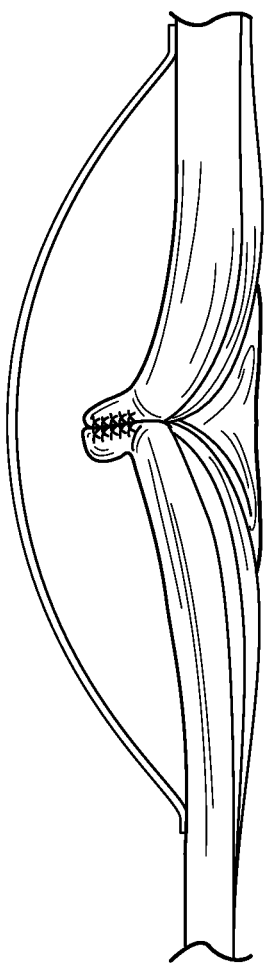
Figure 2:
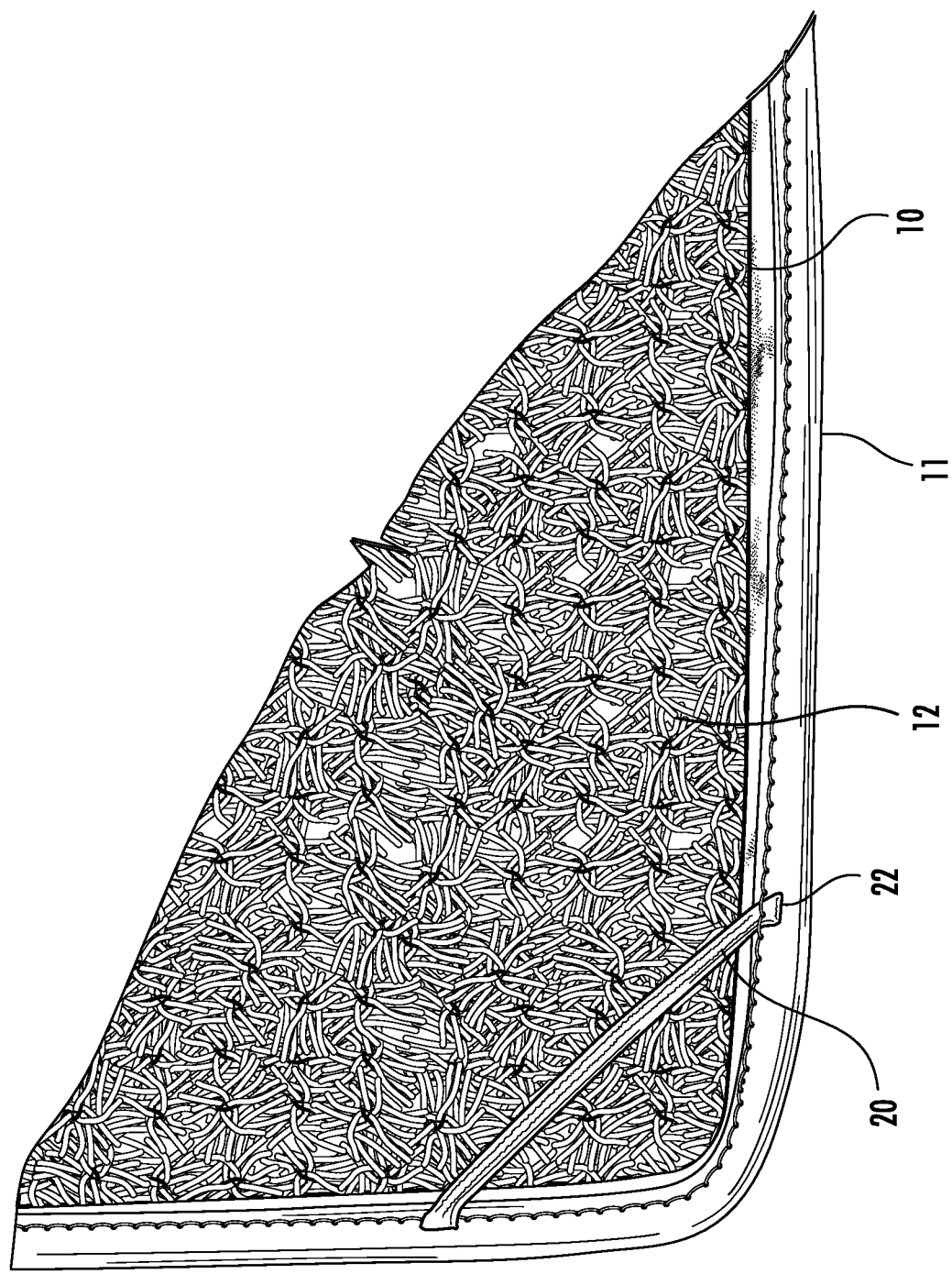
FIG. 2 shows an elevation view of an embodiment of the present invention.

Absorbent second layer 11 may be manufactured such that the corners and/or edges of the layer bend slightly upward as depicted in FIG. 1B and FIG. 5. In this arrangement, second layer 11 is designed to cradle first layer 10 to confine the urine and/or other liquids to second layer 11's absorbent portions. This design would effectively prevent urine or other liquids from dripping down the sides of second layer 11. The cradling, effect of second layer 11 may be accomplished using known assembly and stitching techniques which create sufficient tension and force at the corners to cause the corners to bend upwards as illustrated in FIG. 1B.

First layer 10 and/or second layer 11 may comprise a first engagement means wherein first layer 10 may be secured to second layer 11 or vice versa. The first engagement means employed must be capable of quick and convenient disengagement allowing the user to conveniently disassemble the overall composite structure and clean first layer 10 and second layer 11 as needed. Suitable structures for engagement between first layer 10 and second layer 11 include elastic straps, pressure sensitive adhesive, Velcro®, zippers, buttons, toggles, snaps. grommets, matmets, ties, and the like. In the embodiment illustrated in FIGS. 1, 2, and 4 engagement means comprises elastic straps 18, 19, 20, and 21 sewn at their termini into the binding 22 at each corner of the second layer 11. It should be recognized that the engagement means may be attached to any layer or component of the composite structure. For example, in some embodiments, a binding 22 is not used and the termini of the elastic straps may be sewn into the bottom surface of second layer 11 e.g., at serge stitching along the outer perimeter of the second layer which secures the bottom layer 17 to the second layer.

Figure 8:
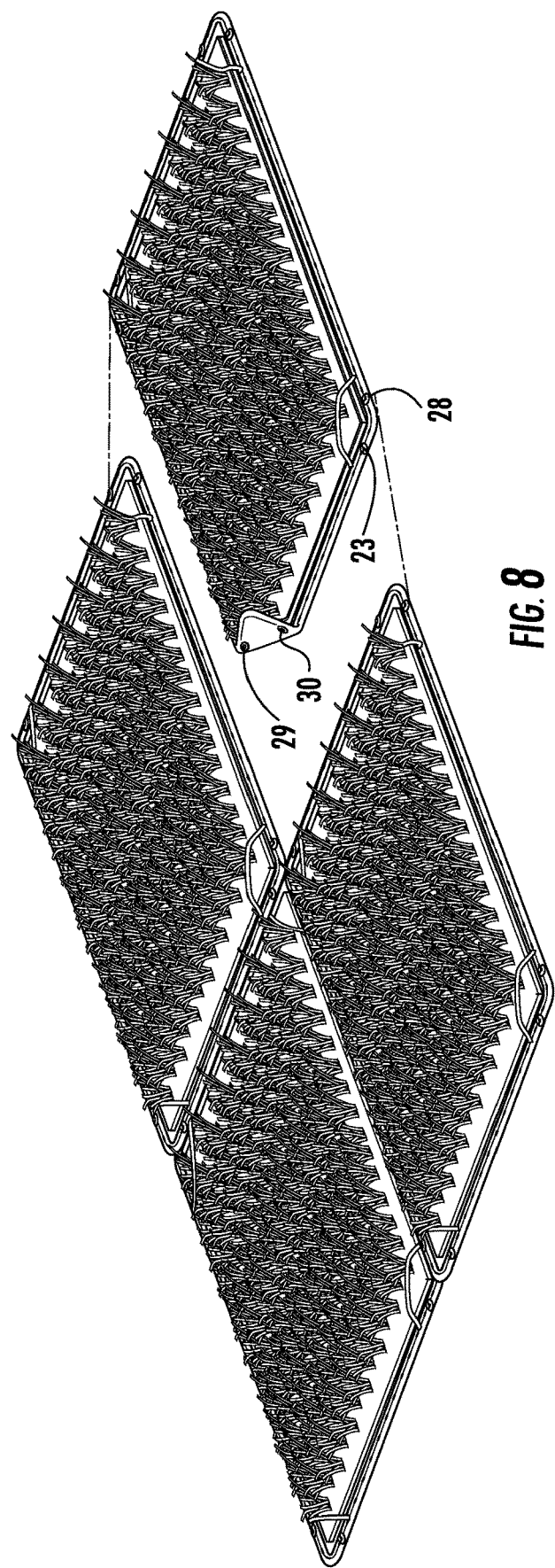
FIG. 8 shows an embodiment of the present invention illustrating a macro composite structure.

Referring now to FIG. 8, in some embodiments, one or more of the layers of the composite structure may be modular and attachable to other modular components to cover a. larger area. For example (with continued reference to FIG. 8), second layer 11 may comprise securing members around the perimeter of the modular section which, in this embodiment, may be a 2'×3' rectangular section. Securing, members may comprise snaps, buttons, Velcro, adhesive, or the like. It should be recognized that any method or structure may be used to secure adjacent modular sections to one another such that the sections are laid out substantially flat and with minimal overlap between them.

Figure 9A:
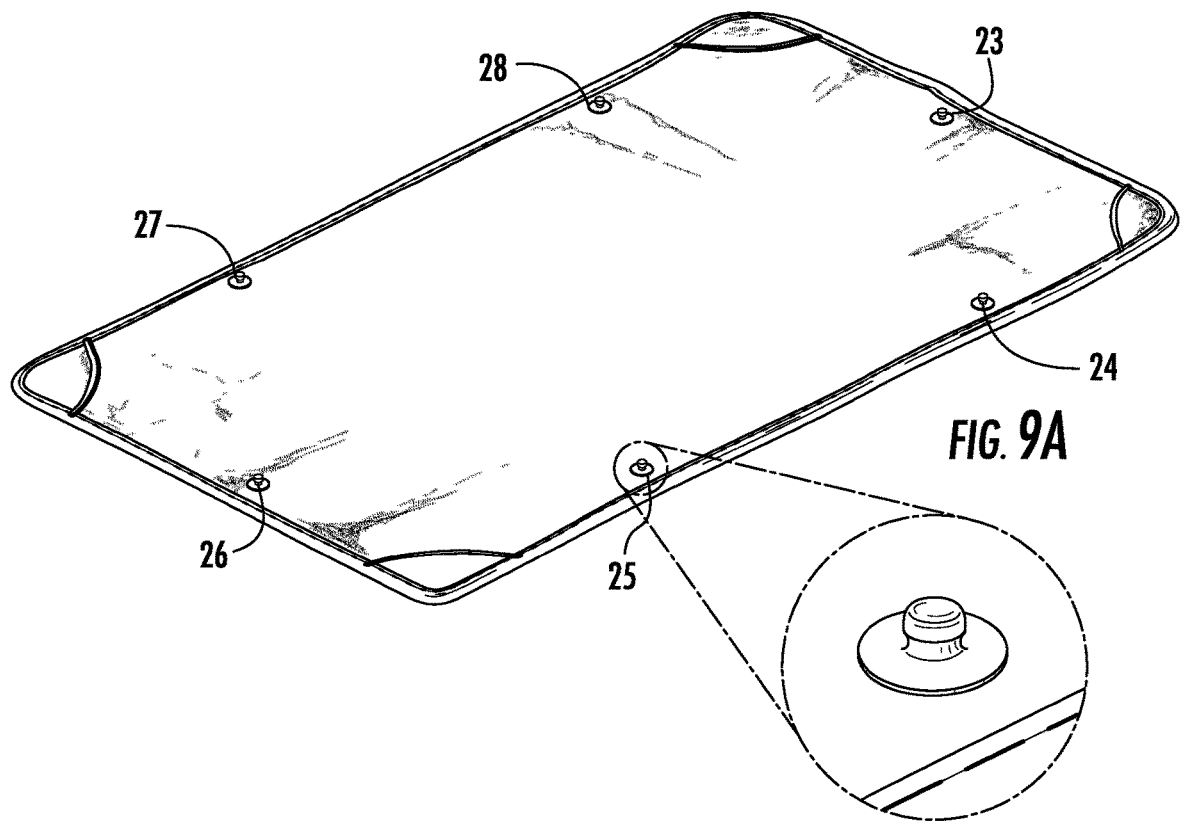
FIG. 9A-B shows an embodiment of the second layer of a composite structure with top and bottom snap elements used to engage corresponding snap elements of other second layers.
Figure 9B:
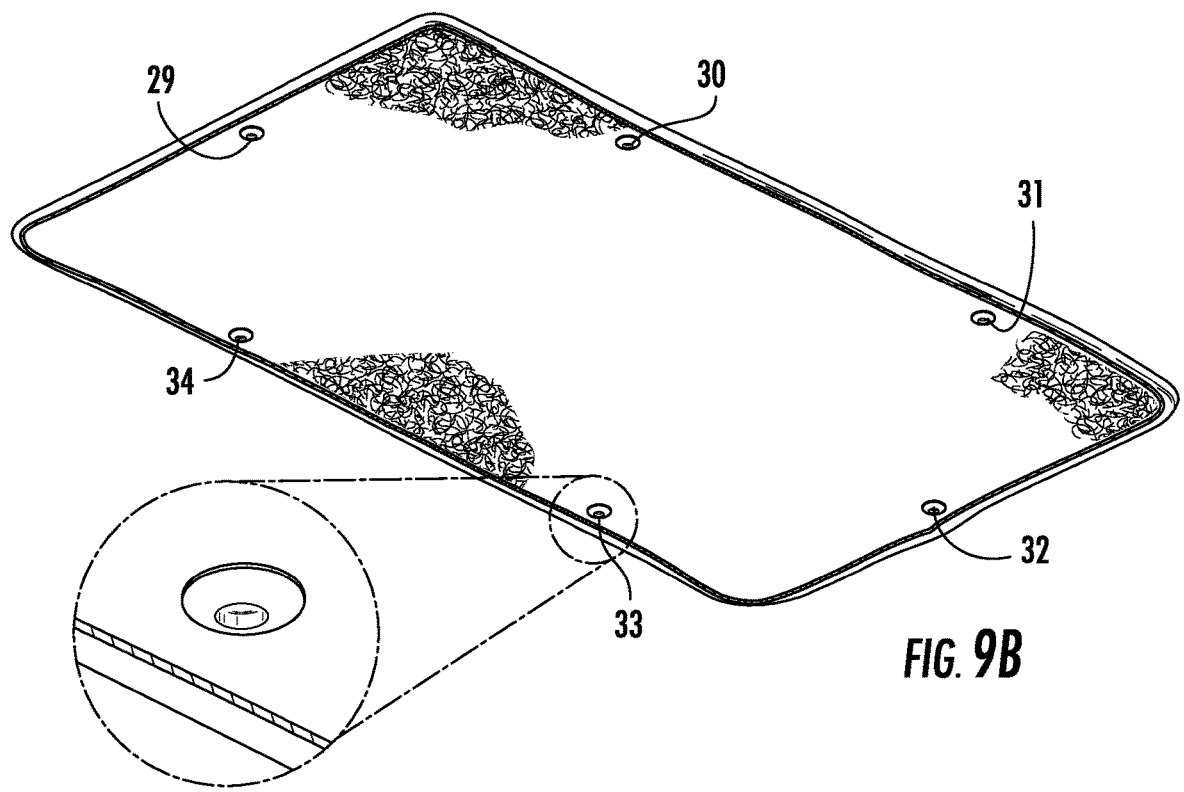
Figure 10:
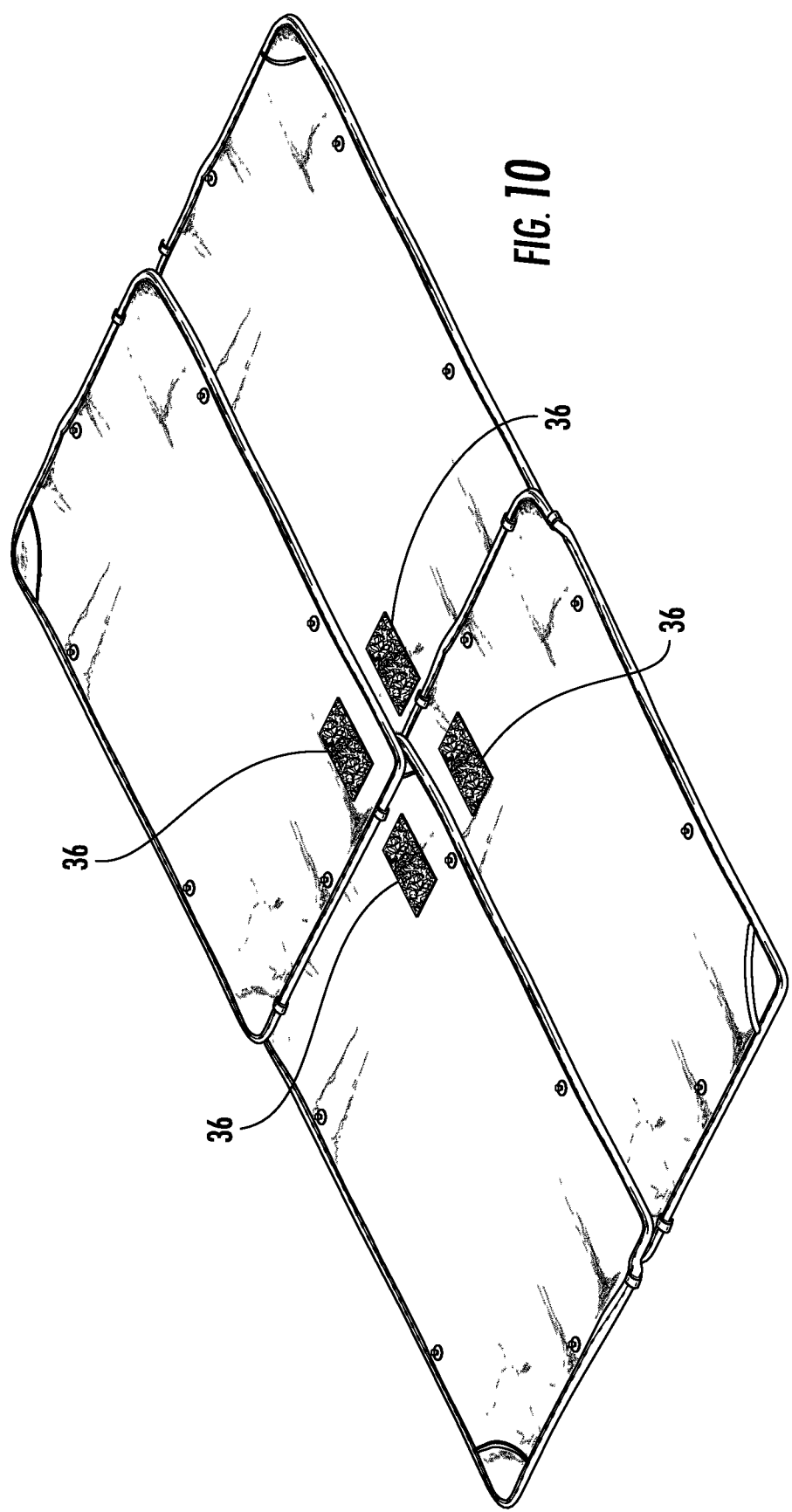
FIG. 10 shows an embodiment of four second layers snapped together and overlapping one another to form a macro-composite structure.
Figure 11:
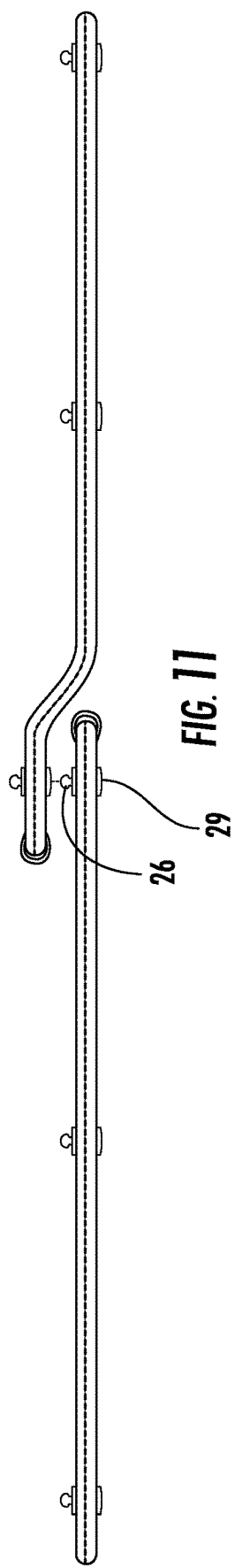
FIG. 11 shows a side view of two adjacent second layer's secured together with partial overlap between second layer's illustrated.

Referring now to the embodiment shown in FIG. 9A-B, second layer 11 may comprise both male and female snap elements for engagement with other adjacent composite structures. For example, in one embodiment male snap elements 23-28 may he placed around the perimeter of the top surface of second layer 11 and complementary female snap elements 29-34 may be placed around the perimeter of the bottom surface of the second layer 11 for securing to their male counterparts. The snap elements 23-34 may be positioned such that akijacent second layer's that have been secured together via snap elements or other securing member partially overlap as shown most clearly in FIGS. 10-11. This is important to prevent unwanted seeping of fluids through or between second layers. In one embodiment, snap elements are furthermore positioned within or upon the absorbent surface inside the outer perimeter binding. This ensures that any fluid dripping off the side of the top second surface will be captured and contained by the absorbent material on the bottom second layer. In one embodiment, snap elements are at least 0.25 inches from the nearest outer edge of second layer 11.

Figure 12:
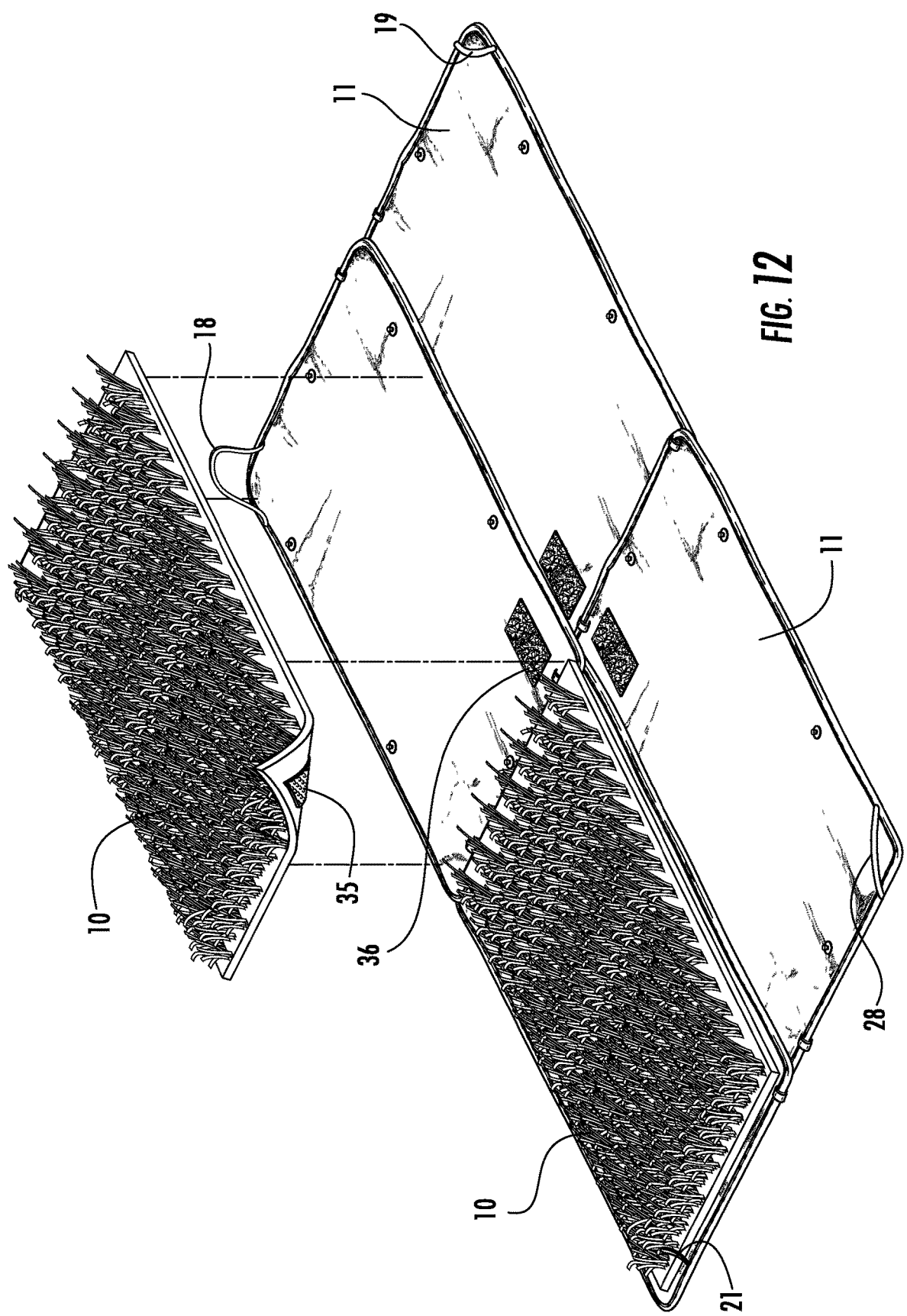
FIG. 12 shows an elevated view of the formation of a macro-composite from four micro-composites without trays.

As shown in the embodiment depicted in FIG. 12, in use, all four elastic straps 18, 19, 20, and 21 or a subset of the straps may be used. For example, when engaging four composite structures (two or more micro-composite structures combined "macro-composite"), the user may decide to use only the straps positioned at the four corners of the macro-composite. For enhanced stability between first layer and second layer, first and second layer may comprise a second engagement means 35, 36 (shown in FIG. 12), for example, Velcro to further secure first layer to second layer. Applying a second engagement means would help to avoid unwanted movement of first layer with respect to second layer, for example, in a macro composite when fewer than all four straps on one composite unit are used.

Figure 13:
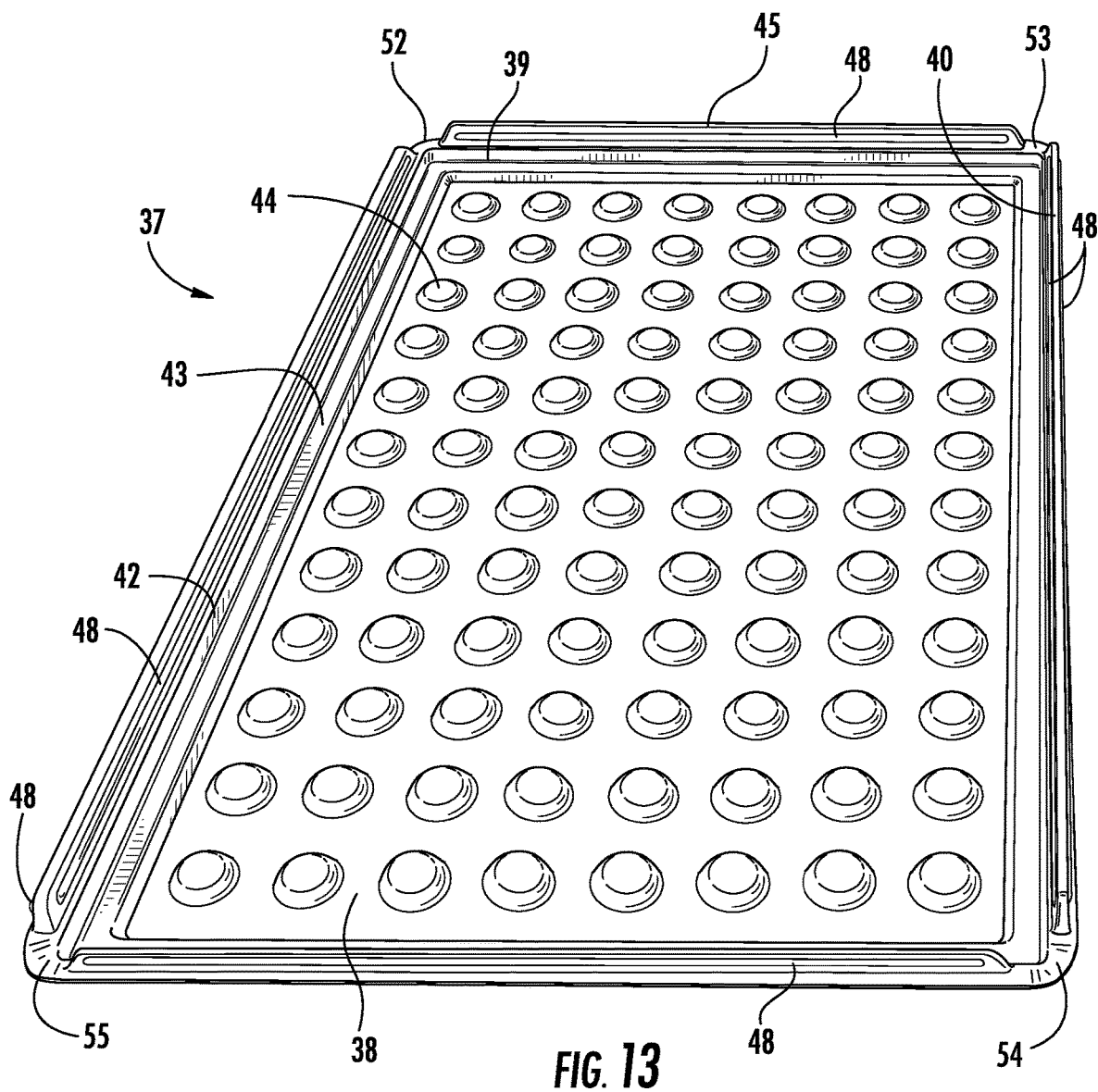
FIG. 13 shows an embodiment of a tray.
Figure 14A:
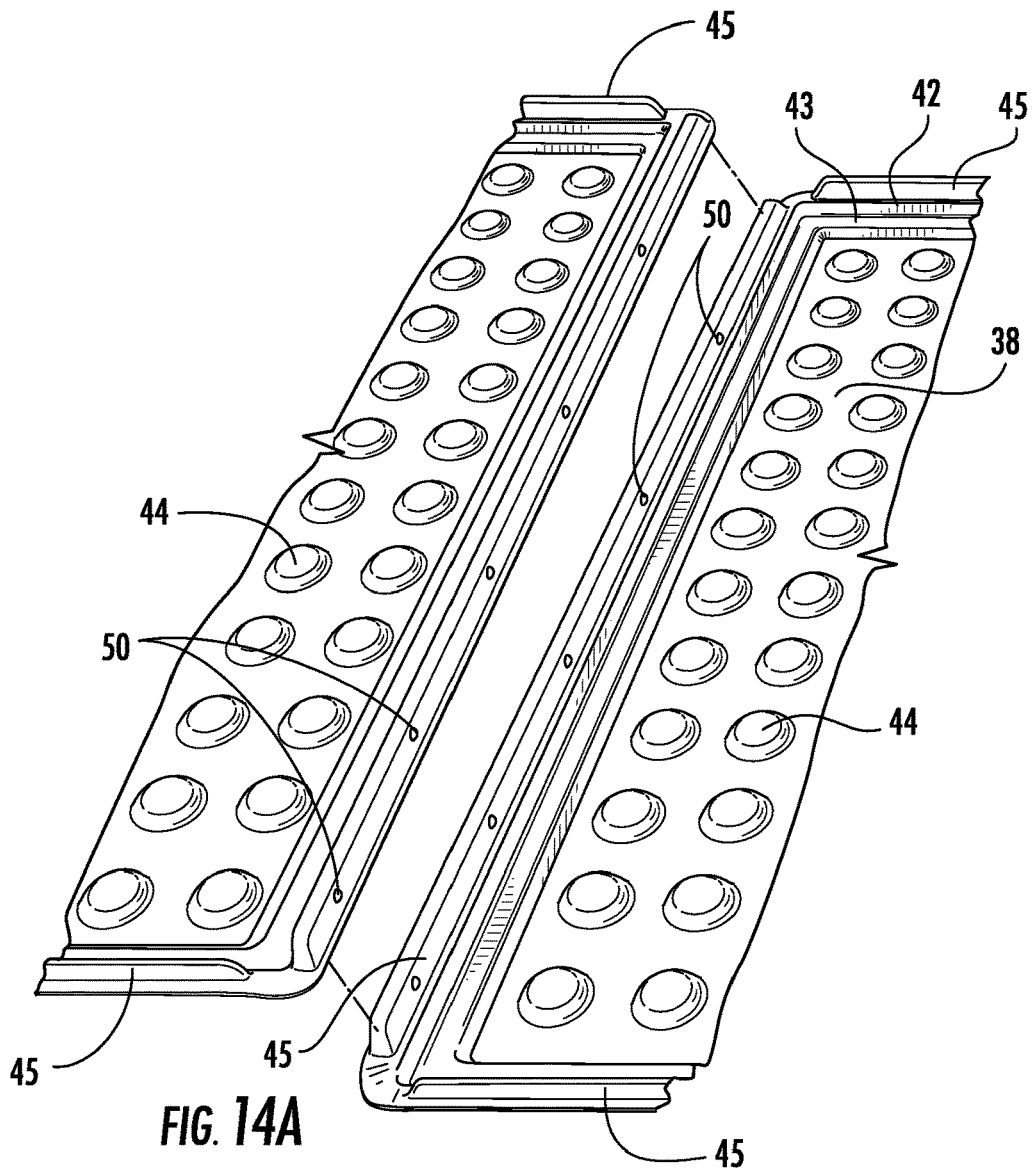
FIG. 14A shows tongue and groove engagement between two adjacent trays and FIG. 14B shows a side view of the bond thrilled by the tongue and groove connection and FIG. 14C shows a side view of a tongue and groove, engagement illustrating a locking member embodiment.
Figure 14B:
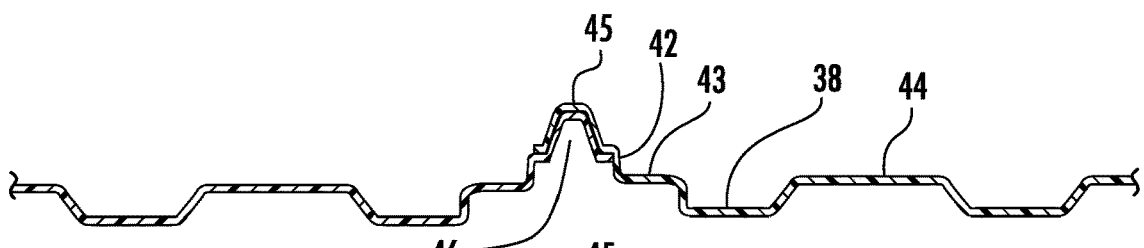
Figure 14C:
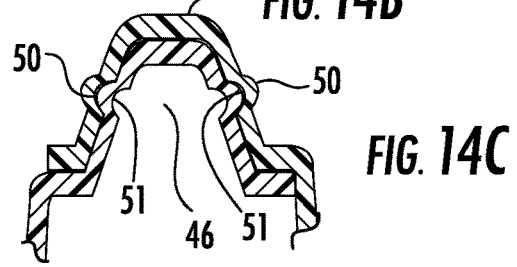
Figure 15:
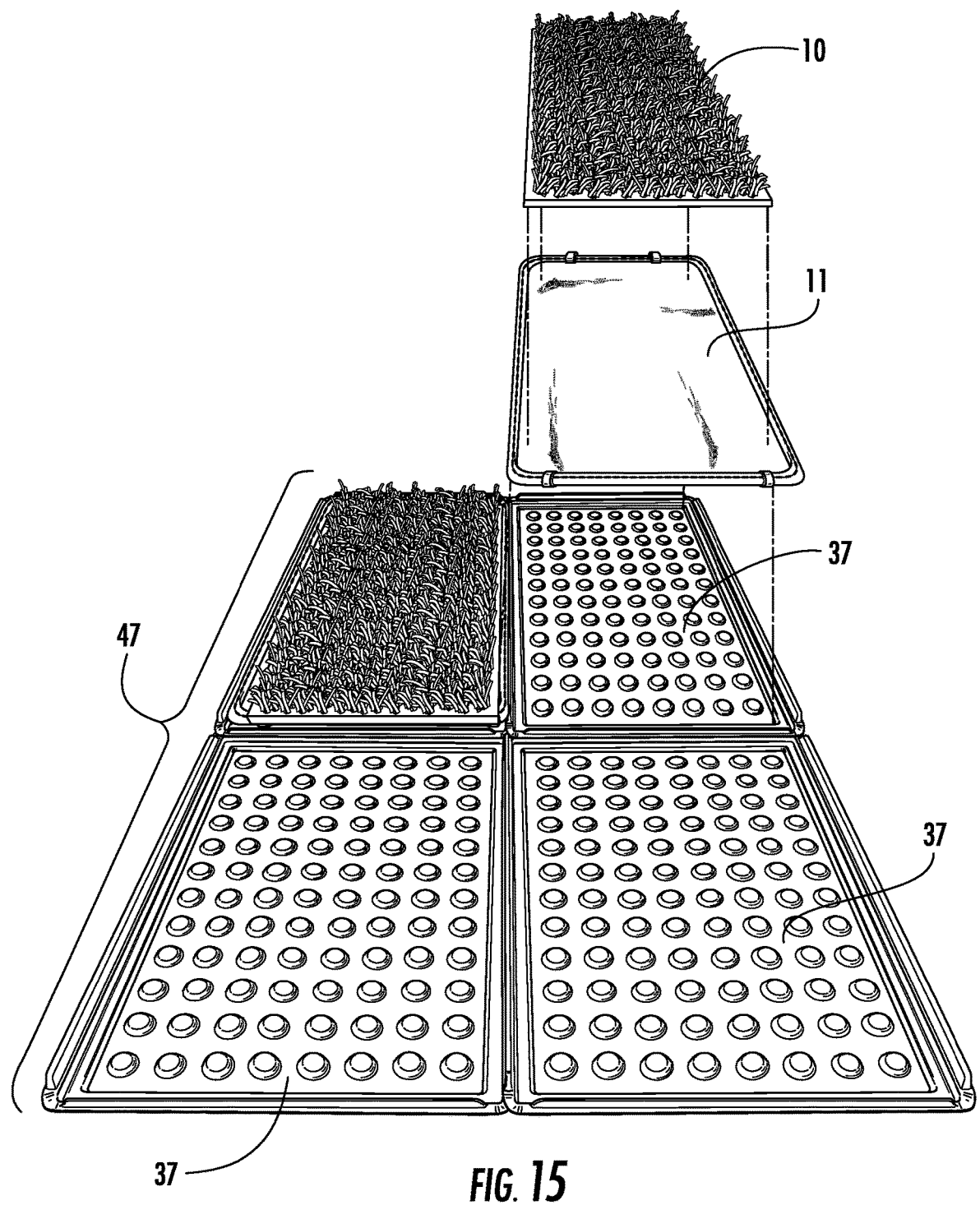
FIG. 15 shows an elevated view of the formation of a macro-composite from four micro-composites with trays.

Referring now to FIGS. 13-15, in some embodiments, composite trays 37 may be used wherein said combined first and second layers are placed. Referring now to FIG. 13, composite trays 37 may comprise a bottom surface 38; side walls 39, 40, 41, 42; composite outer edge support 43 positioned around the perimeter of the composite tray and inside the side walls. in some embodiments, bottom surface 38 may further comprise one or more elevation members 44 which serve to elevate composite structure off the bottom surface of composite tray 37. This feature prevents over saturation of composite structure and provides channels through which fluids may pass underneath said composite structure.

With continued reference to FIGS. 13-14, composite tray 37 may further comprise one or more tongues 45 and one or more grooves 46 for engaging two or more adjacent trays together when forming a macro-composite 47. In one embodiment, each said groove 46 is formed from the hollow underside of each said tongue 45. When a user wishes to secure one or more trays together, the user merely overlays a groove 46 in one tray upon a corresponding tongue 45. When composite trays are used in this context, there may be no need to engage the second layers together since the trays are connected in a manner that avoids fluid leakage or seepage between trays due to the overlapping nature of the tongue and groove connection. Trays that have been secured together in this manner form a bond substantially impenetrable by pet waste. Composite structures may merely be placed in their respective trays which are attached to one another as illustrated in FIG. 15. In another embodiment, said tongue 45 and said groove 46 may further comprise locking members that lock said adjacent trays together when the groove of one tray overlays the tongue of an adjacent tray. Said locking members may comprise a rib assembly, for example, wherein said rib 48 extends the entire or partial length of a tongue. Upon overlay of said tongue and groove of adjacent trays and application of a slight downward pressure, said rib would engage its groove complement 49 within the groove of the other tray. In another embodiment, said locking members may comprise male detents 50 formed along the side surface of the tongue which again, as pressure is applied, interlock with their complimentary female detents 51 on an adjacent tray.

Referring now to FIGS. 13 and 14A, composite trays may further comprise one or more fluid extraction channels for convenient discarding or removal of waste fluids from the tray. In the embodiment shown in FIG. 13, channels 52, 53, 54, 55 are positioned at each corner in the gap between adjacent tongues alone, the perimeter of the tray. In some embodiments, the side wall at the fluid extraction channel may have a greater slope than other parts of the side wall allowing a more uniform and smoother flow of waste fluid through the channel as the user tilts the tray to discard the fluid.

Figure 16A:
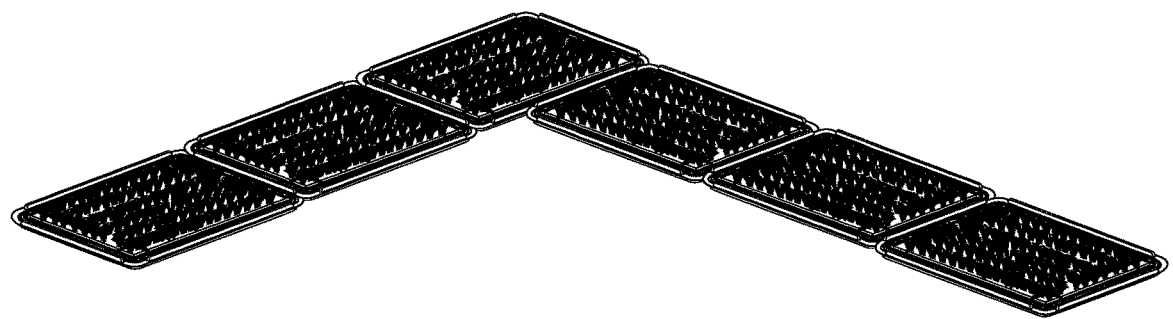
FIG. 16A-D shows elevated views of lour macro-composite embodiments.
Figure 16B:
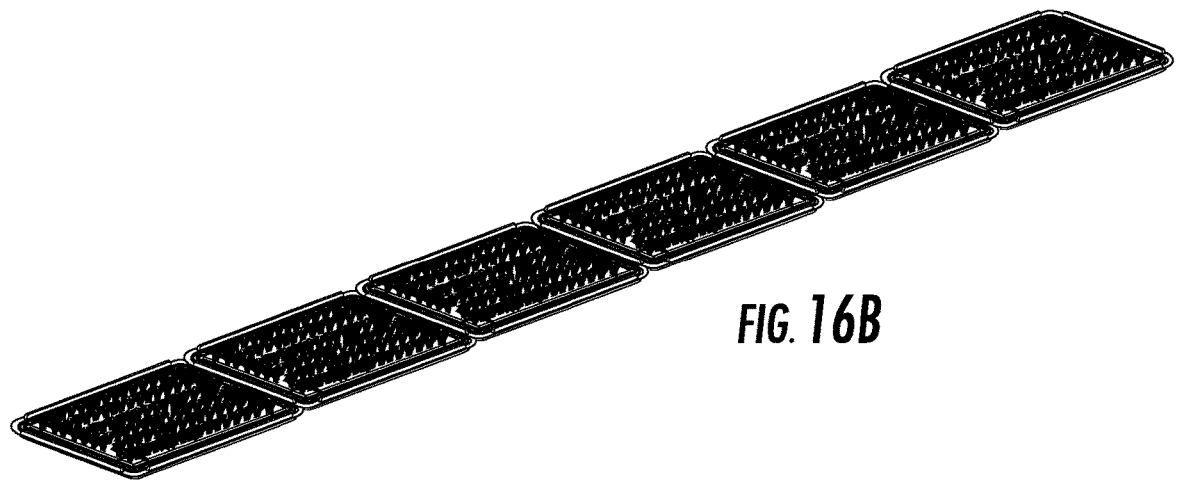
Figure 16C:
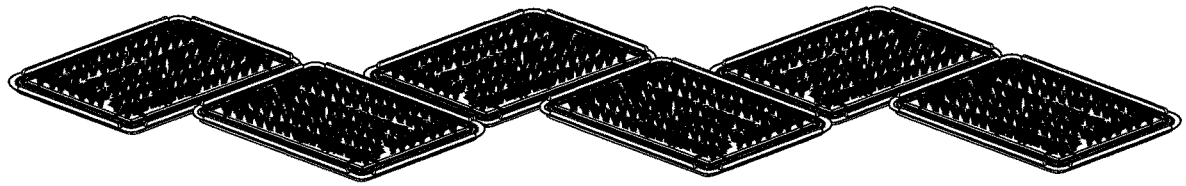
Figure 16D:
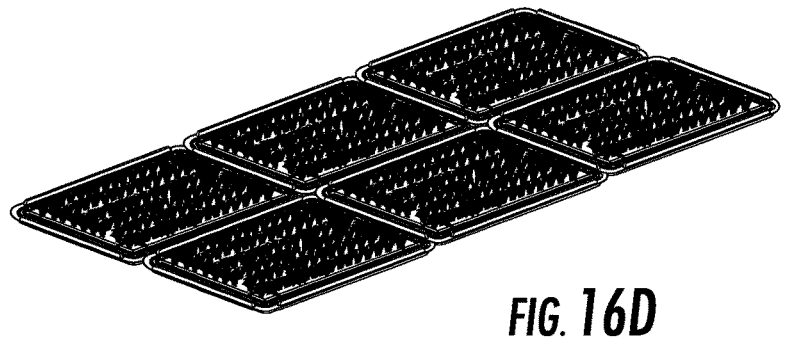

Referring now to FIG. 16A-D and, as described in some detail above, micro-composite structures may be combined with other micro-composite structures to form a macro-composite for increased or enhanced surface area coverage. While the macro-composite embodiments shown in FIG. 16A-D all comprise trays underlying the first and second layers, it should be understood that the macro-composites ma be formed with or without trays. For example, in FIG. 16A, a macro-composite structure is formed between six micro-composite structures forming a 90° angle for rounding a corner between two intersecting, walls within a home or apartment. FIG. 16B illustrates another macro-composite embodiment that is formed from six linearly arranged macro-composites for hallway coverage. FIG. 16C illustrates a macro-composite that forms a zigzag design and FIG. 16D is a macro-composite structure that is rectangular in shape for greater area or floor coverage, for example, substantially all of a single room. FIG. 16A-D is intended to illustrate the versatility and adaptability of the micro-composite structures to form a myriad of configurations.

Figure 17:
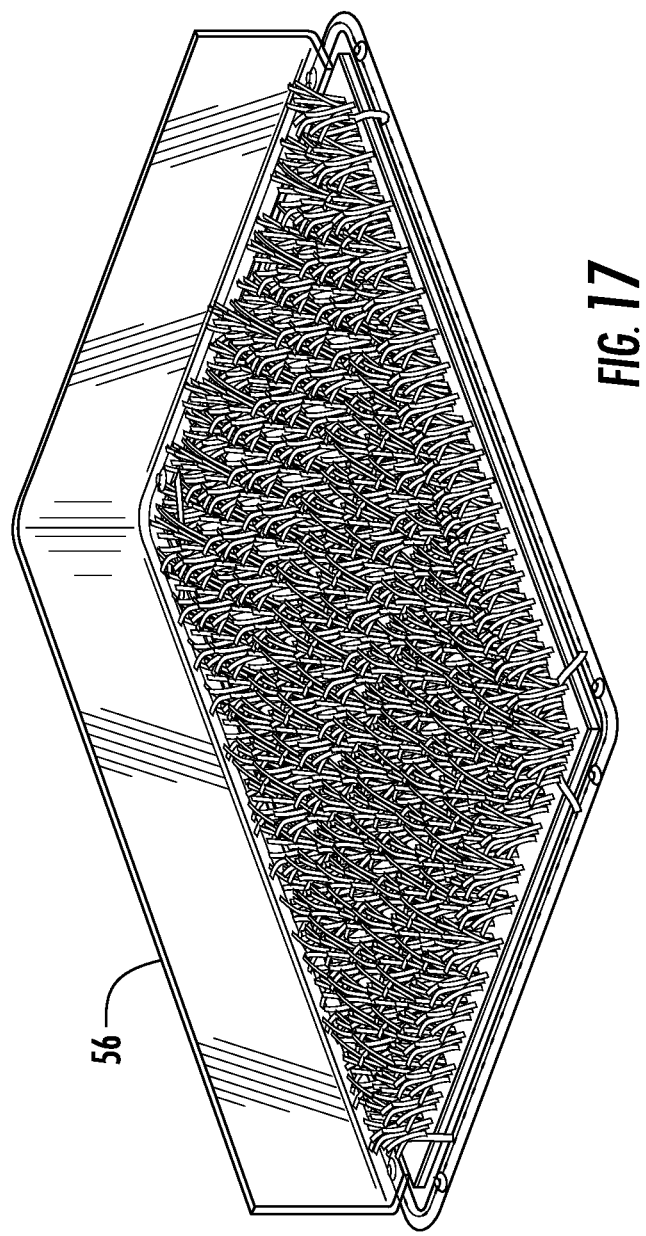
FIG. 17 shows an embodiment of the present invention with a vertical member attached.
Figure 18:
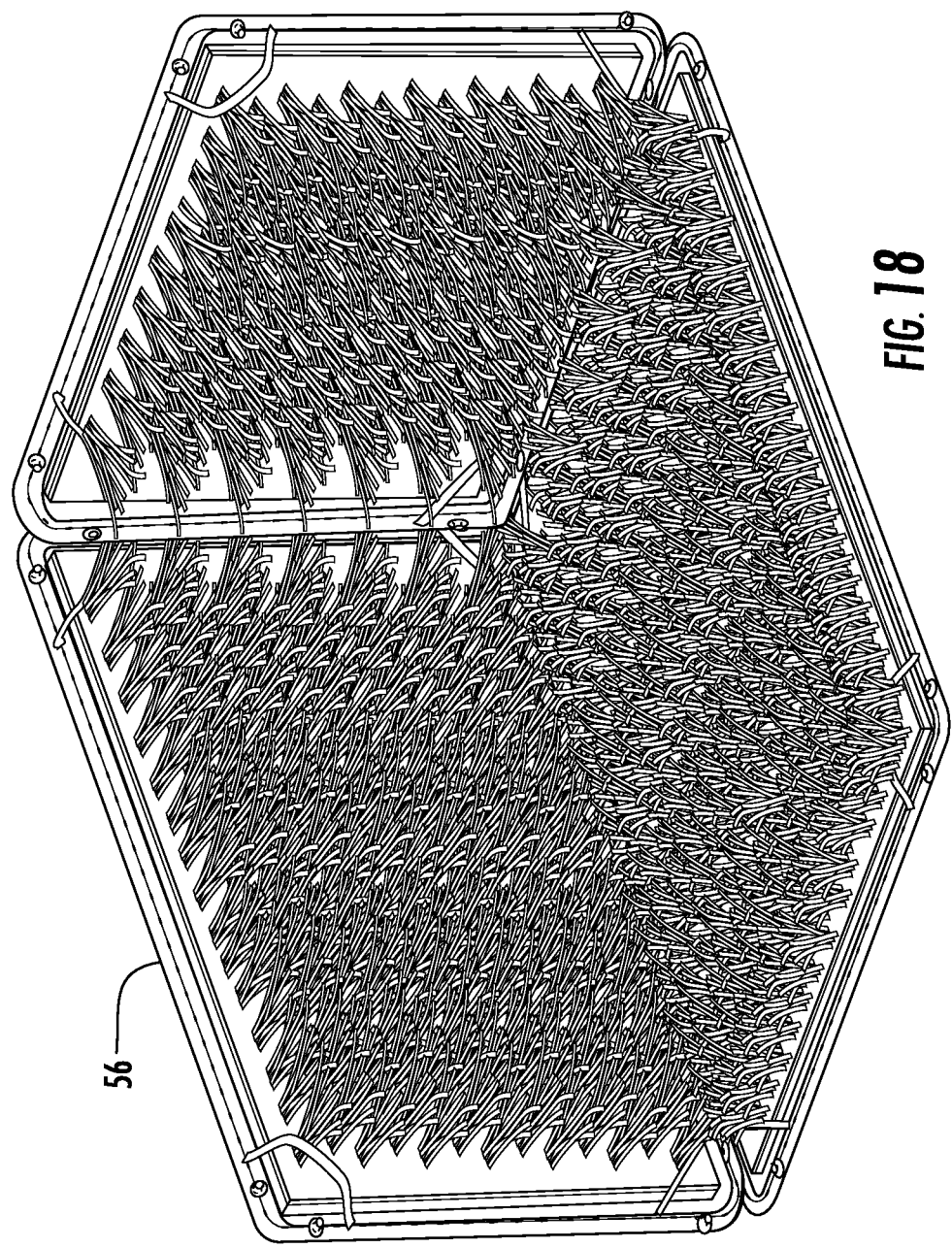
FIG. 18 shows an embodiment of the present invention with a vertical member attached.

Referring now to FIGS. 17 and 18, in some embodiments, the composite structure also comprises a substantially vertical member 56 which helps to confine unwanted pet waste to the composite structure for pets with poor aim, in particular male dogs with a preference for the lifted leg method over the squatting method. It has been observed that male dogs frequently miss the composite structure surface when they lift their legs to urinate.

In one embodiment, the substantially vertical member 56 may be engaged to composite structure around the perimeter and detachable therefrom. In some embodiments, the substantially vertical structure is itself modular. For example, in one embodiment, the substantially vertical structure comprises corner elements that are curved to surround the outer edge of each corner of the composite structure. Additionally, such a modular system might also comprise side panel elements that, in some embodiments, engage and connect to the corner members at their vertical edges. In said embodiments, the side panel elements run laterally down the outer edges of the composite structure between corner members. The substantially vertical structure may entirely surround the composite structure or may only guard a portion of the composite structure, for example, one side and two corners. In some embodiments, the securing members may be used to attach the components of the substantially vertical structure to the composite structure.

The substantially vertical member may be made of various materials, for example, thermoplastic materials including Poly(methyl methacrylate) (PMMA) or plexiglas, as well as various polyolefin polymers, such as polyethylene or polypropylene. It should be recognized that many suitable materials are available for use in this manner as long as they are sufficiently rigid to maintain its substantially vertical orientation.

The substantially vertical member may also incorporate a decorative design, for example, the vertical member may be manufactured such that it resembles a picket fence. In another embodiment, one or more of the walls of the substantially vertical member may comprise a splatter dampening member. For example, in one embodiment, the interior wall may comprise an absorbent fabric covering to help prevent urine from splattering outside of the composite structure area.

The present invention also generally relates to a method of pet waste disposal wherein a user employs the system to conveniently and cleanly capture and discard pet waste with minimal waste contamination of the residence living environment. In one embodiment, the method comprises the steps of providing a composite structure according to the description of the embodiments provided above, attaching said first layer to said second layer, placing said composite structure on a solid support surface in a manner accessible to the animal, and cleaning said second layer when substantially saturated with liquid waste. In another embodiment, the method may further comprise the step of attaching a plurality of composite structures together to accommodate a larger area such that the second layers are attached in a manner that avoids leakage of fluid between second layers. In another embodiment, the method may further comprise the step of attaching a plurality of trays together and placing a corresponding number of composite structures within said trays. In said method, a user may discard any urine collected in the bottom of said trays by tilting the trays in a manner promoting flow of urine through the built in extraction channels. In another embodiment, the method may also comprise attaching a substantially vertical element to the outer perimeter of the composite structure to avoid floor waste contamination.

In an another embodiment, the method of pet waste containment and disposal comprises the steps of providing a macro-composite portable sanitation apparatus in variable geometric, configurations upon a horizontal surface comprising a plurality of micro-composite structures. In some embodiments each micro-composite structure may comprise a first layer wherein said first layer comprises artificial grass-like fibers, a backing member, and a mesh substrate, and a second layer comprising an absorbant top element, an impervious backing element top, bottom, and side outer edges and a front and back face wherein said front and back faces comprise a plurality of securing members for securing to one or more adjacent second layers. The method may further comprise the steps of securing said second layers of adjacent micro-composites together wherein said second layers partially overlap for proper waste containment; attaching said first layer of each micro-composite structure to said second layer to form a macro-composite; placing said macro-composite on a solid support surface in a manner accessible to the animal, and cleaning said second layers when substantially saturated with liquid waste.

In yet another embodiment, the method of pet waste containment and disposal comprising the steps of providing a macro-composite portable sanitation apparatus in variable geometric configurations upon a horizontal surface comprising a plurality of micro-composite structures. In some embodiments each micro composite structure may comprise a first layer wherein said first layer comprises artificial grass-like fibers, a backing member, and a mesh substrate, a second layer comprising an absorbant top element, an impervious backing element, and an underlying tray for supporting said first and second layers. In some embodiments, the tray may comprise a tongue and groove assembly for engaging with one or more other adjacent trays, and waste extraction channels. The method may comprise the additional steps of securing said tongue of one tray to the matching groove of an adjacent tray resulting in an overlapping bond between adjacent trays impenetrable to liquid or solid, pet waste; attaching said first layer of each micro-composite structure to said second layer to form a plurality of micro-composites; placing each said micro-composite within a corresponding tray to form the macro-composite; and placing said macro-composite on a solid support surface in a manner accessible to the animal. In some embodiments, the method may further comprise one or more of the following steps: removing the first and second layers from said tray and cleaning said second layer when saturated with pet waste; tilting said tray to dispose of remaining pet waste through said waste extraction channels; arranging and securing the micro-composite structures together in variable desired configurations including but not limited to a right angle configuration, a substantially rectangular configuration, a substantially square configuration, or a zigzag configuration.

While the present invention has been described herein with respect to the exemplary embodiments, it will become apparent to one of ordinary skill in the art that many modifications, improvements and sub-combinations of the various embodiments, adaptations and variations can be made to the invention without departing from the sprit and scope thereof.

What is claimed is:

1. A portable sanitation micro-composite apparatus for pet waste disposal and macro-composite assembly in variable geometric configurations upon a horizontal surface comprising a first layer, a second absorbent layer capable of absorbing and substantially retaining liquid pet waste, and an underlying tray for supporting the first and second layers, wherein the tray comprises a bottom surface, side walls, an outer edge support for supporting the first and second layers, a plurality of elevation protrusions extending upward from the bottom surface for elevating the first and second layers off the bottom surface of the tray, and a tongue and groove assembly for engaging with one or more other adjacent trays for macro-composite assembly wherein the engagement produces a substantially impenetrable overlapping bond along the entire side wall length.

2. The portable sanitation micro-composite apparatus of claim 1 wherein the tongue and groove assembly comprises four tongues extending from the side walls of the tray and four grooves generated by the hollowed out portion of the tongues and wherein the tongue mates with the matching groove on an adjacent tray to secure two trays together.

3. The portable sanitation micro-composite apparatus of claim 1 wherein the tray further comprises waste extraction channels positioned between the adjacent tongues extending from adjacent side walls of the tray.

4. The portable sanitation micro-composite apparatus of claim 1 wherein the tongue and groove assembly further comprises one or more locking members.

5. The portable sanitation micro-composite apparatus of claim 1 wherein the tongue and groove assembly further comprises one or more detents for securing the tongue and groove to one another.

6. The portable sanitation micro-composite apparatus of claim 1 wherein the tongue and groove assembly further comprise a rib for securing the tongue and groove to one another.

7. A method of pet waste containment and disposal comprising the steps of providing two or more micro-composite structures, each micro-composite structure comprising a first layer and a second absorbent layer capable of absorbing and substantially retaining liquid pet waste comprising a top, bottom, and side outer edges and a front and back face wherein the front and back faces comprise a plurality of securing members for securing to one or more adjacent second layers; securing the second layers of adjacent micro-composites together wherein the second layers partially overlap for proper waste containment to form a macro-composite structure; attaching the first layer of each micro-composite structure to the second layer; and positioning the macro-composite on a solid support surface in a manner accessible to a pet animal and in a desired geometric configuration.

8. A method of pet waste containment and disposal comprising the steps of providing a two or more micro-composite, each micro composite structure comprising a first layer, a second absorbent layer capable of absorbing and substantially retaining liquid pet waste, and an underlying tray for supporting the first and second layers comprising a tongue and groove assembly for engaging with one or more other adjacent trays, and waste extraction channels; attaching the first layer of each micro-composite structure to the second layer; placing the first and second layers within a corresponding tray; securing the tongue of one tray to the matching groove of an adjacent tray resulting in an overlapping bond between adjacent trays substantially impenetrable to liquid or solid pet waste to form a macro-composite structure; and positioning the macro-composite on a solid support surface in a manner accessible to a pet animal and in a desired geometric configuration.

9. The method of claim 8 further comprising the step of arranging and securing the micro-composite structures together in a right angle configuration.

10. The method of claim 8 further comprising the step of arranging and securing the micro-composite structures together in a substantially rectangular configuration.

11. The method of claim 8 further comprising the step of arranging and securing the micro-composite structures together in a substantially square configuration.

12. The method of claim 8 further comprising the step of removing the first and second layers from the tray and cleaning the second layer when saturated with pet waste.

13. The method of claim 8 further comprising the step of tilting the tray to dispose of remaining pet waste through the waste extraction channels.

14. The method of claim 8 wherein the tongue and groove assembly further comprises one or more locking members for substantially locking the tongue and groove in place.

* * * * *